(12) United States Patent
Sundman et al.

(10) Patent No.: US 7,523,090 B1
(45) Date of Patent: *Apr. 21, 2009

(54) CREATING DATA CHARTS USING ENHANCED SQL STATEMENTS

(75) Inventors: Daniel Sundman, Mountain View, CA (US); Helge Scheil, San Francisco, CA (US); Scott Pfeiffer, Lindenhurst, IL (US)

(73) Assignee: Niku, Redwood City, CA (US)

(*) Notice: Subject to any disclaimer, the term of this patent is extended or adjusted under 35 U.S.C. 154(b) by 481 days.

This patent is subject to a terminal disclaimer.

(21) Appl. No.: 10/764,182

(22) Filed: Jan. 23, 2004

(51) Int. Cl.
 G06F 17/30 (2006.01)
(52) U.S. Cl. .................. 707/2; 707/1; 707/3; 707/4; 707/100; 707/101
(58) Field of Classification Search ......... 707/100–102, 707/1–5
See application file for complete search history.

(56) References Cited

U.S. PATENT DOCUMENTS

| | | | | |
|---|---|---|---|---|
| 5,414,838 A | * | 5/1995 | Kolton et al. | 705/36 R |
| 5,428,737 A | * | 6/1995 | Li et al. | 707/4 |
| 5,797,136 A | * | 8/1998 | Boyer et al. | 707/2 |
| 5,894,311 A | * | 4/1999 | Jackson | 345/440 |
| 6,226,630 B1 | * | 5/2001 | Billmers | 707/3 |
| 6,571,233 B2 | | 5/2003 | Beavin et al. | |
| 2004/0064456 A1 | * | 4/2004 | Fong et al. | 707/100 |
| 2004/0181378 A1 | * | 9/2004 | Gilmore | 703/6 |
| 2004/0252121 A1 | * | 12/2004 | Bhatt et al. | 345/440 |
| 2005/0086188 A1 | | 4/2005 | Hillis et al. | |
| 2005/0102284 A1 | * | 5/2005 | Srinivasan et al. | 707/4 |

* cited by examiner

Primary Examiner—Cam-Linh Nguyen
(74) Attorney, Agent, or Firm—Blakely, Sokoloff, Taylor & Zafman LLP

(57) ABSTRACT

A method and system for providing customized filters to restrict datasets retrieved from a database are described. In one embodiment, the method includes receiving a data access query that combines a structured query language (SQL) statement with output related characteristics of an output data chart. The data access query is provided by a first user. The method further includes building the output data chart for a second user using the data access query.

22 Claims, 17 Drawing Sheets

CREATING DATA CHARTS USING ENHANCED SQL STATEMENTS

FIELD OF THE INVENTION

The present invention relates to data access and presentation; more particularly, the present invention relates to creating data charts using enhanced data access queries.

BACKGROUND OF THE INVENTION

The ability to collect massive amounts of information has become a necessity in business today. It thus becomes important that organizations and individuals are provided with a work environment in which information is delivered to them in a meaningful way. Existing tools typically provide visibility into this information using a report engine or a database application enabling navigation to the information of interest.

A report engine usually creates reports that are more meaningful to software developers than to end users. In addition, analysis of a report may be time-consuming because a report does not visually illustrate the relationships between its data elements.

A database application typically retrieves data from a database in response to a query. Queries are often written by software developers or database administrators who are familiar with a database query language (e.g., the structured query language (SQL)) and the data model of the database. When an end user needs to see a combination of data that cannot be retrieved by an existing query, the end user has to request a database administrator to create a new query for the desired combination of data. This results in inconvenience and inefficiency.

Some database applications allow end users to define data queries using tools that do not require extensive knowledge of database operation and structure. However, the end users typically need extensive training to be able to use those tools productively and without professional help.

SUMMARY OF THE INVENTION

A method and system for creating data charts using enhanced data access queries are described. According to one aspect, the method includes receiving a data access query that combines a structured query language (SQL) statement with output related characteristics of an output data chart. The data access query is provided by a first user. The method further includes building the output data chart for a second user using the data access query.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 10-16 illustrate exemplary user interfaces presented in a data chart creation process, according to one embodiment of the present invention.

DETAILED DESCRIPTION OF THE PRESENT INVENTION

Figure 1:
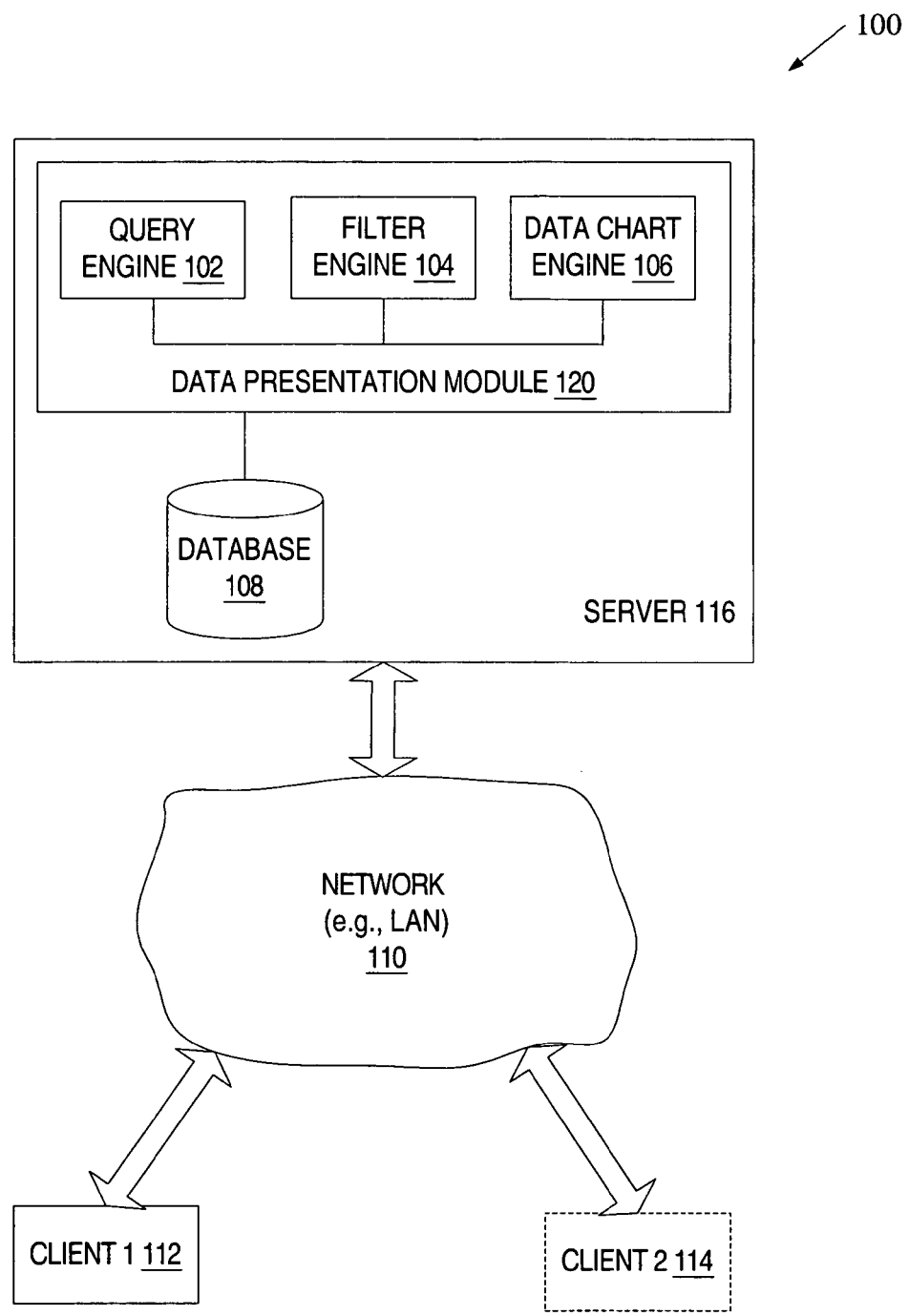
FIG. 1 is a block diagram of one embodiment of a system in which embodiments of the present invention may operate.

A method and apparatus for creating data charts using enhanced data access queries are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable storage medium includes read only memory ("ROM"); random access memory ("RAM"); magnetic disk storage media; optical storage media; flash memory devices; etc.

Overview

As described above, existing database access products fail to provide end users with easy-to-use tools for restricting datasets that are to be retrieved from a database and presented to the end users.

One embodiment of the present invention solves this problem by providing modifiable filters for which end users can specify different parameters depending on how they want to restrict a data set retrieved from a database.

In one embodiment, the modifiable filters are created using a template data access query that is defined by a query administrator (e.g., a database administrator or any other database specialist who is familiar with the data model of a database). A template data access query identifies database tables to be accessed but does not contain filters that specify how to restrict a data set to be returned from a database. Depending on the filters subsequently added to the template data access query, various different final queries can be created from the template access query. For example, a template data access query may be a structured query language (SQL) statement that has a SELECT clause specifying table columns and a FROM clause specifying database tables to be accessed. This SQL statement represents a template query because its WHERE clause does not contain filter information on how to restrict the data set returned from the database, and as such can result in different final queries depending on the filter information subsequently added.

A filter engine receives the template data access query and identifies multiple data elements from the database tables that are to be accessed. In one embodiment, the multiple data elements (e.g., column names of database tables) are specified in the template data access query. In another embodiment, the template access query may only specify the database tables to be accessed but not the specific data elements (e.g., an SQL statement may request to retrieve data from all columns of the database tables in the FROM clause). Then, the filter engine may need to execute the template data access query to identify data elements in the specified database tables.

Once the filter engine identifies the data elements, it creates a set of preliminary filters. A filter is a component that defines how a data set retrieved from a database can be restricted. A filter may include a specific data element and a parameter for this data element. When a filter is used, only a data set satisfying the filter's parameter is retrieved from the database. A preliminary filter identifies a data element but does not specify a parameter that enables restriction of data being retrieved from the database. A parameter may be a single value, multiple values or a range of values.

The set of preliminary filters created by the filter engine may cover some or all of the data elements associated with the template data access query. In one embodiment, each preliminary filter is associated with the data type of a corresponding data element.

Next, in one embodiment, each preliminary filter is associated with a group of properties that will be discussed in more detail below.

Further, in one embodiment, a data chart engine defines a layout for a data presentation and associates this layout with the resulting preliminary filters. The data presentation may be a graph, a grid, a report, or any other form of data presentation. The layout of the data presentation and the associated preliminary filters are presented to an end user (e.g., a company's employee who may not be familiar with the data model of the database and/or may not have sufficient knowledge of a database query language). In one embodiment, a data presentation user interface is used to communicate the layout of the data presentation and the associated preliminary filters to the end user. The data presentation user interface may also allow the end user to provide parameters for the preliminary filters.

In one embodiment, the filter engine checks the parameters provided by the end user using the data types of the preliminary filters. If there is no conflict, the filter engine forms final filters by adding the user-specified parameters to the corresponding preliminary filters and including the final filters into the template data access query to create a final data access query.

Afterwards, the final access query is executed to build the data presentation with the retrieved content for the end user.

Accordingly, an end user is provided with an easy-to-use data access tool that allows the end user to control how to restrict a data set returned from a database.

Another embodiment of the present invention is directed to simplifying the process of creating an output data chart. An output data chart such as, for example, a graph or a grid provides a graphical representation of the relationships between data elements of presented data. The simplification of the data chart creation process is achieved using an enhanced data access query. An enhanced data access query may be defined by a query administrator (e.g., a database administrator or any other database specialist who is familiar with the data model of the database). An enhanced data access query combines an SQL statement with output related characteristics by associating the output related characteristics with corresponding data elements in the SELECT clause. The output related characteristics may include, for example, dimensions of an output data chart, dimension properties (values that further describe a dimension), metrics (measured data elements such as, for example, allocated hours, booked hours, etc.), etc.

In one embodiment, a query engine receives an enhanced data access query defined by a query administrator, extracts an SQL statement from it and executes the SQL statement to check whether the syntax of the enhanced data access query is correct. If the syntax is correct, a data chart engine stores the data elements identified in the SQL query with corresponding output related characteristics.

Next, a data chart definition phase is performed with the participation of a data chart administrator. A data chart administrator may be a query administrator, an end user, or a third person responsible for the data chart definition phase. In one embodiment, this phase begins with requesting the data chart administrator to specify the type of the output data chart (e.g., whether it is a grid or a graph). In one embodiment, the data chart engine determines which data chart types are available for the combination of the output related characteristics from the enhanced data access query and asks the data chart administrator to select a desired data chart type from the available data chart types.

Upon receiving information identifying the desired data chart type, the data chart engine builds the output data chart using the output related characteristics from the enhanced data access query. In one embodiment, the output data chart is built without any additional input from the data chart administrator (e.g., if the output data chart is a one-dimensional grid). In another embodiment, the data chart engine requests additional input from the data chart administrator when building the output data chart (e.g., if the output data chart is a multi-dimensional graph, the data chart administrator may need to specify which dimension is to be a primary dimension for the main axis in the graph).

Further, in one embodiment, the output data chart is made available for plugging into a personalized web page of an end user.

In one embodiment, the data chart engine cooperates with the filter engine to build an output data chart with customized filters for end users. In particular, once an enhanced data access query is provided by a query administrator, the filter engine creates a set of preliminary filters as discussed above. When the data chart engine defines the layout of an output data chart, it associates the layout with the preliminary filters and allows an end user to specify values for the preliminary filters. As a result, different end users may use different instances of the same output data chart and any end user may include several instances of the same output data chart into his or her personalized web page, with each instance of the output data chart having a different set of filters.

FIG. 1 is a block diagram of one embodiment of a system 100 in which embodiments of the present invention may operate. System 100 includes a server 116 and a client computer 112 coupled to the server 116 via a network 110. The network 110 may be any private network (e.g., LAN, Intranet, etc.) or any public network (e.g., Internet, wireless network, etc.). The client computer 112 (referred to herein as client 112) is operated by an end user who represents a company's employee or any other individual who may be unaware of the data model of a database maintained by the company and/or may not have sufficient knowledge of a database query language.

The server 116 includes a data presentation module 120 coupled to one or more databases 108. In one embodiment, the data presentation module 120 includes a query engine 102, a filter engine 104 and a data chart engine 106, and allows an end user to specify how to filter a data set retrieved from the database 108 for presentation to the end user. In this embodiment, the query engine 102 is responsible for receiving a template data access query and, in one embodiment, for executing it to check whether the syntax of this template data access query is correct. A template data access query is defined by a query administrator (e.g., a database administrator or any other database specialist who is familiar with the data model of the database) as a template for different final data access queries that can be created by adding varying filter information to the template data access query. The filter information specifies how to restrict the data set returned from the database 108.

The filter engine 104 is responsible for identifying multiple data elements associated with the template data access query and for creating a set of preliminary filters based on the identified data elements. As discussed above, a preliminary filter identifies a data element (e.g., a database table column) but does not specify a corresponding parameter that would enable restriction of a data set retrieved from the database. A parameter may be a single value, multiple values, or a range of values. The set of preliminary filters may cover some or all of the data elements identified by the filter engine 104. In one embodiment, the filter engine 104 associates each preliminary filter with the data type of a corresponding data element and with other filter properties that will be discussed in greater detail below.

The data chart engine 106 is responsible for defining the layout for data presentation, associating this layout with the resulting preliminary filters, and saving the data presentation layout with the corresponding preliminary filters in a repository. The data may be presented as a graph, a grid, a report, or any other form of data presentation. Subsequently, when the end user requests via the client 112 to view the layout of the data presentation, the data chart engine 106 generates a data presentation user interface that identifies the layout of the data presentation and the associated preliminary filters and allows the end user to provide parameters for the preliminary filters.

When the end user specifies the parameters for the preliminary filters, the filter engine 104 adds the user-specified parameters to the corresponding preliminary filters and includes the resulting final filters into the template data access query to create a final data access query.

When the end user requests to view the data, the data chart engine 106 builds the data presentation with the content that is retrieved from the database 108 using the final data access query.

In another embodiment, the data presentation module 120 is responsible for creating an output data chart using an enhanced data access query. An output data chart (e.g., a graph, a grid, etc.) provides a graphical representation of the relationships between data elements of presented data. An enhanced data access query defined by a query administrator combines an SQL statement with output related characteristics by associating the output related characteristics with corresponding data elements in the SELECT clause. The output related characteristics may include, for example, dimensions of an output data chart, dimension properties (values that further describe a dimension), metrics (measured data elements such as, for example, allocated hours, booked hours, etc.). In this other embodiment, the query engine 102 is responsible for receiving an enhanced data access query defined by a query administrator, extracting an SQL statement from it, and executing the SQL statement to check whether the syntax of the enhanced data access query is correct. The data chart engine 106 is responsible for building an output data chart using the output related characteristics identified in the SQL query. In one embodiment, the building process has two phases. During the first phase, the data chart engine 106 is responsible for receiving an enhanced data access query, extracting data elements and associated output related characteristics from the enhanced data access query, and storing them together. The second phase is performed by the data chart engine 106 using input provided by a data chart administrator. The data chart administrator may be the same person as the query administrator or the end user. Alternatively, the data chart administrator may be some other person who provides input via a client 114.

In one embodiment, the data chart engine 106 begins the second phase with requesting the query administrator to specify the type of the output data chart (e.g., whether it is a grid or a graph). Upon identifying the data chart type, the data chart engine 106 builds an output data chart of the identified type using the output related characteristics from the enhanced data access query. In one embodiment, the data chart engine 106 builds the output data chart without any additional input from the query administrator (e.g., if the output data chart is a one-dimensional grid). In another embodiment, the data chart engine requests additional input from the query administrator when building the output data chart (e.g., if the output data chart is a multi-dimensional graph, the data chart administrator may need to specify which dimension is to be a primary dimension for the main axis in the graph).

Further, in one embodiment, the data chart engine 106 makes the output data chart available for integration into a personalized web page of an end user.

In yet another embodiment, the data presentation module 120 adds customized filter capability to the data chart building process. In particular, the query engine 102 is responsible for receiving an enhanced data access query defined by a query administrator, extracting output related characteristics, and checking the syntax of the remaining SQL statement. The filter engine 104 is responsible for analyzing the SQL statement to identify multiple data elements from database tables to be accessed and for creating a set of preliminary filters based on the identified data elements. The data chart engine 106 is responsible for defining the layout of an output data chart, associating the preliminary filters with the layout of the output data chart, collecting additional information about the preliminary filters and the data chart layout from a data chart administrator and an end user, and building the data chart based on the output related characteristics and the additional information collected from the data chart administrator and the end user.

Customizable Filters

Figure 2:
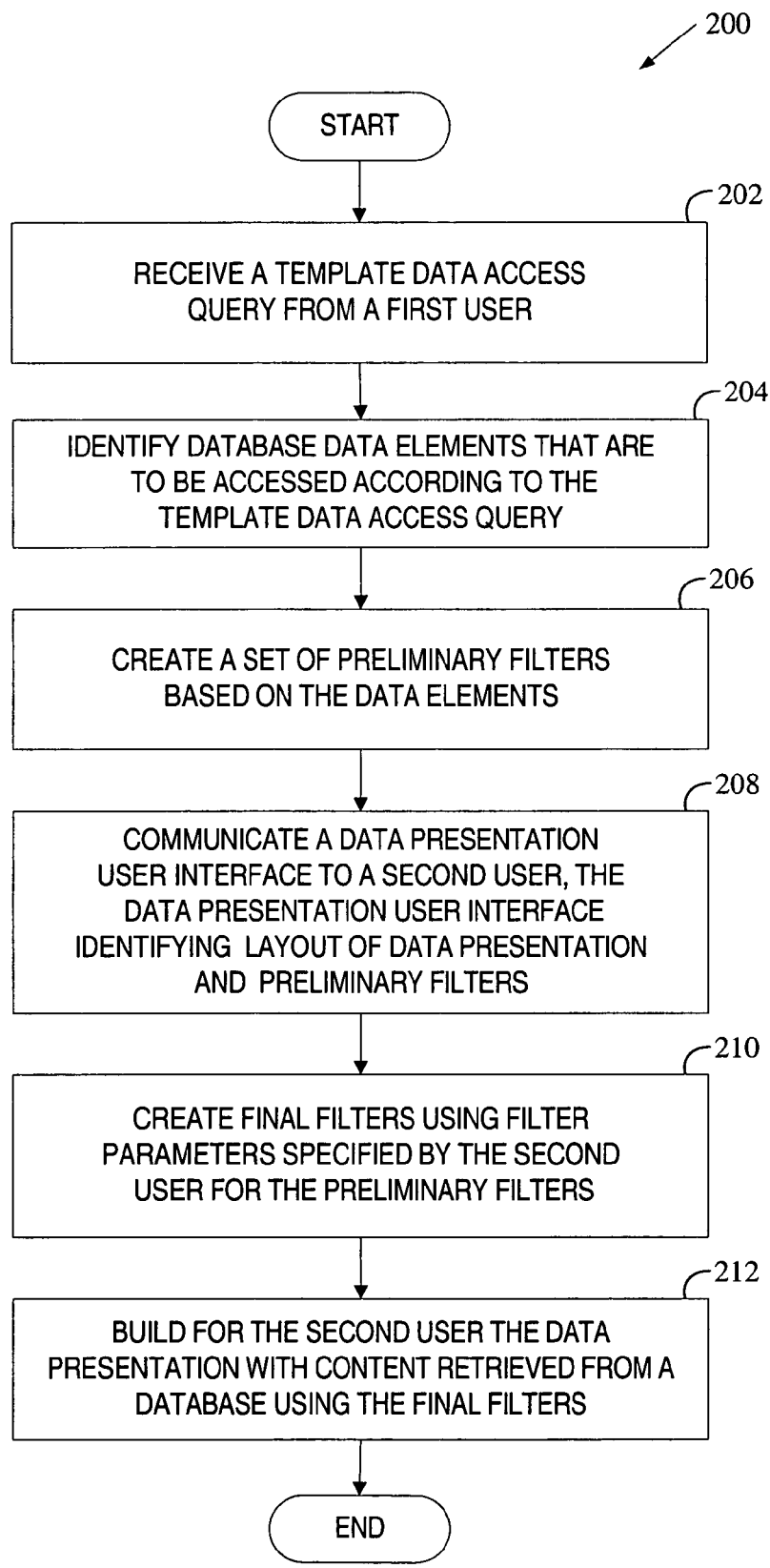
FIG. 2 is a flow diagram of one embodiment of a process for presenting data using customizable filters.

FIG. 2 is a flow diagram of one embodiment of a process 200 for presenting data using customizable filters. The process may be performed by processing logic that may comprise hardware (e.g., dedicated logic, programmable logic, microcode, etc.), software (such as run on a general purpose computer system or a dedicated machine), or a combination of both.

Referring to FIG. 2, process 200 begins with processing logic receiving a template data access query from a first user (processing block 202). As discussed above, a template data access query identifies database tables to be accessed but does not contain filters that specify how to restrict a data set to be returned from a database. For example, a template data access query may be an SQL statement with a WHERE clause that does not contain filter information on how to restrict the data set returned from the database. A first user may be a database administrator or any other query administrator who has knowledge of the database data model.

At processing block 204, processing logic identifies database data elements that are to be accessed according to the template data access query. In one embodiment, processing logic identifies the database data elements by reading the template data access query (e.g., the SELECT clause may specify database table columns from which data is to be retrieved). In another embodiment, the template data access query may not contain specific references to the data elements to be accessed (e.g., the SELECT clause may require that data be retrieved from all columns of the database tables in the FROM clause). Then, processing logic may execute the template data access query to identify the data elements associated with the template access query.

At processing block 206, processing logic creates a set of preliminary filters based on the identified data elements. A preliminary filter identifies a data element (e.g., a database table) from which data is to be retrieved but does not specify a parameter that enables restriction of the data being retrieved. One embodiment of a process for creating a set of preliminary filters is discussed in more detail below in conjunction with FIG. 3.

At processing block 208, processing logic communicates a data presentation user interface to a second user. A second user is an end user who may or may not have significant knowledge of the database data model. The data presentation user interface presents the layout of a data presentation (e.g., a grid, a graph, a report, or any other form of data presentation) and identifies the preliminary filters associated with the data elements of the data presentation.

Further, at processing block 210, processing logic receives filter parameters specified by the second user and creates final filters using these filter parameters. In one embodiment, the data presentation user interface facilitates user input of the filter parameters.

Afterwards, at processing block 212, processing logic builds the data presentation with the content that is retrieved from the database using the final filters.

Figure 3:
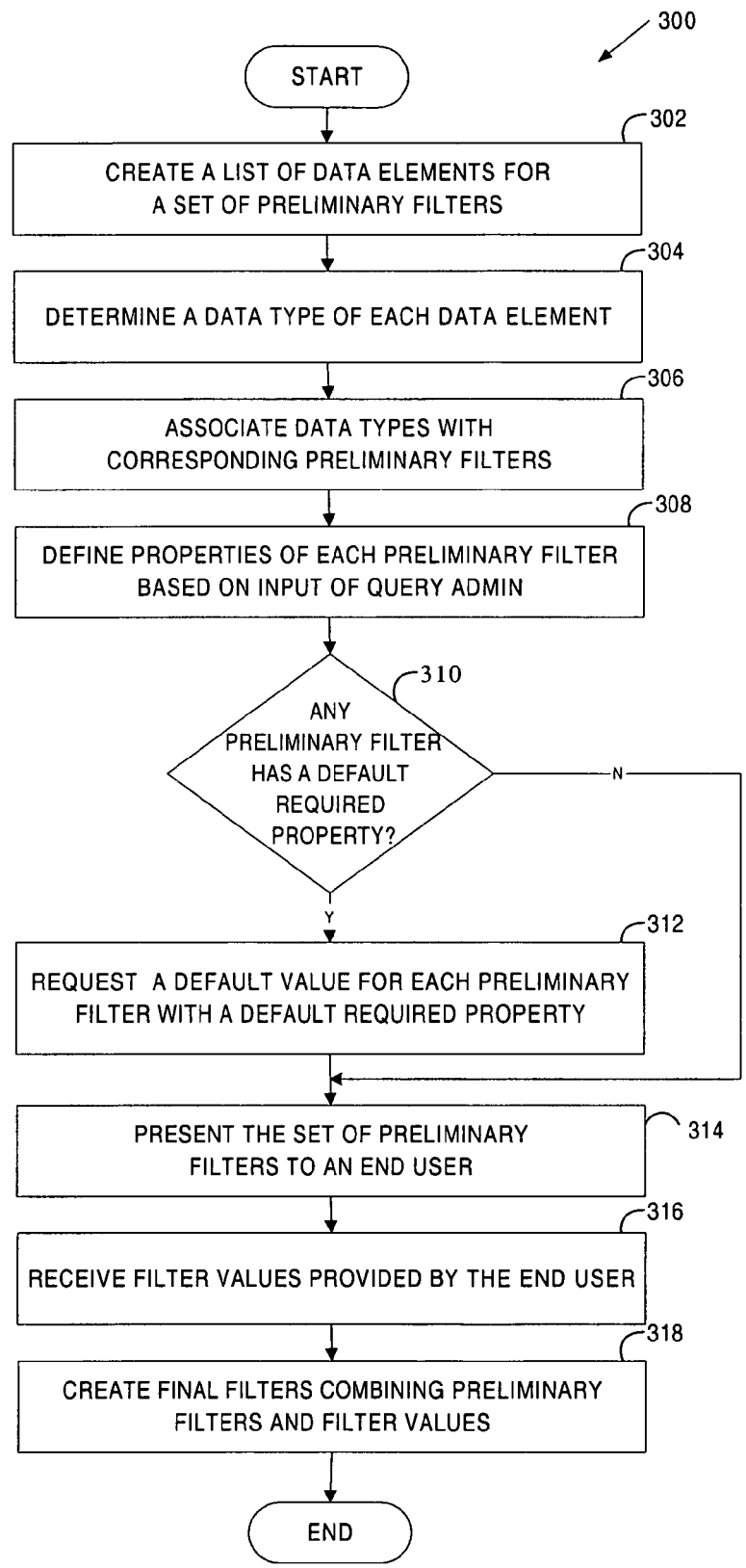
FIG. 3 is a flow diagram of one embodiment of a process for creating customizable filters.

FIG. 3 is a flow diagram of one embodiment of a process 300 for creating customizable filters. The process may be performed by processing logic that may comprise hardware (e.g., dedicated logic, programmable logic, microcode, etc.), software (such as run on a general purpose computer system or a dedicated machine), or a combination of both.

Referring to FIG. 3, process 300 begins with processing logic creating a list of data elements for a set of preliminary filters (processing block 302) as discussed in more detail above. Next, processing logic determines the data type of each data element (processing block 304) and associates the resulting data types with corresponding preliminary filters (processing block 306). In one embodiment, the data types are determined by executing a query requesting data type information from the database.

At processing block 308, processing logic defines properties of each preliminary filter. Properties of each preliminary filter may include a filterable property indicating whether an associated data element is allowed to be filtered by an end user, a default required property indicating whether an associated data element is required to have a filter (e.g., based on the query itself), a filter type property indicating the data type of the filter (e.g., string, numeric, date, etc.), a lookup property indicating whether a preliminary filter needs to have a lookup list of values for user selection, etc. Some of these properties may be determined by requesting relevant information from the database. For example, processing logic may query the database about the data types of corresponding data elements. Other properties may be defined based on user input. For example, a query administrator may be allowed to specify whether a preliminary filter can be customized by an end user, whether a preliminary filter requires a default value, or whether a preliminary filter requires a lookup list of filter values for user selection.

Next, processing logic determines whether any preliminary filters have a default required property (processing block 310). If so, processing logic requests a default value for each of such preliminary filters (processing block 312). The default value may be provided by the query administrator or a data presentation administrator who provides information pertaining to the layout of the data presentation.

At processing block 314, processing logic presents the set of preliminary filters to the end user.

Further, processing logic receives filter values provided by the end users (processing block 316), ensures that the provided filter values conform to the data types associated with corresponding filters, and creates final filters by combining the preliminary filters and the filter values (processing block 318). If any filter value provided by the end user does not conform to the data type of the corresponding filter, processing logic requests the end user to re-enter the filter value.

Enhanced Data Access Queries

Figure 4:
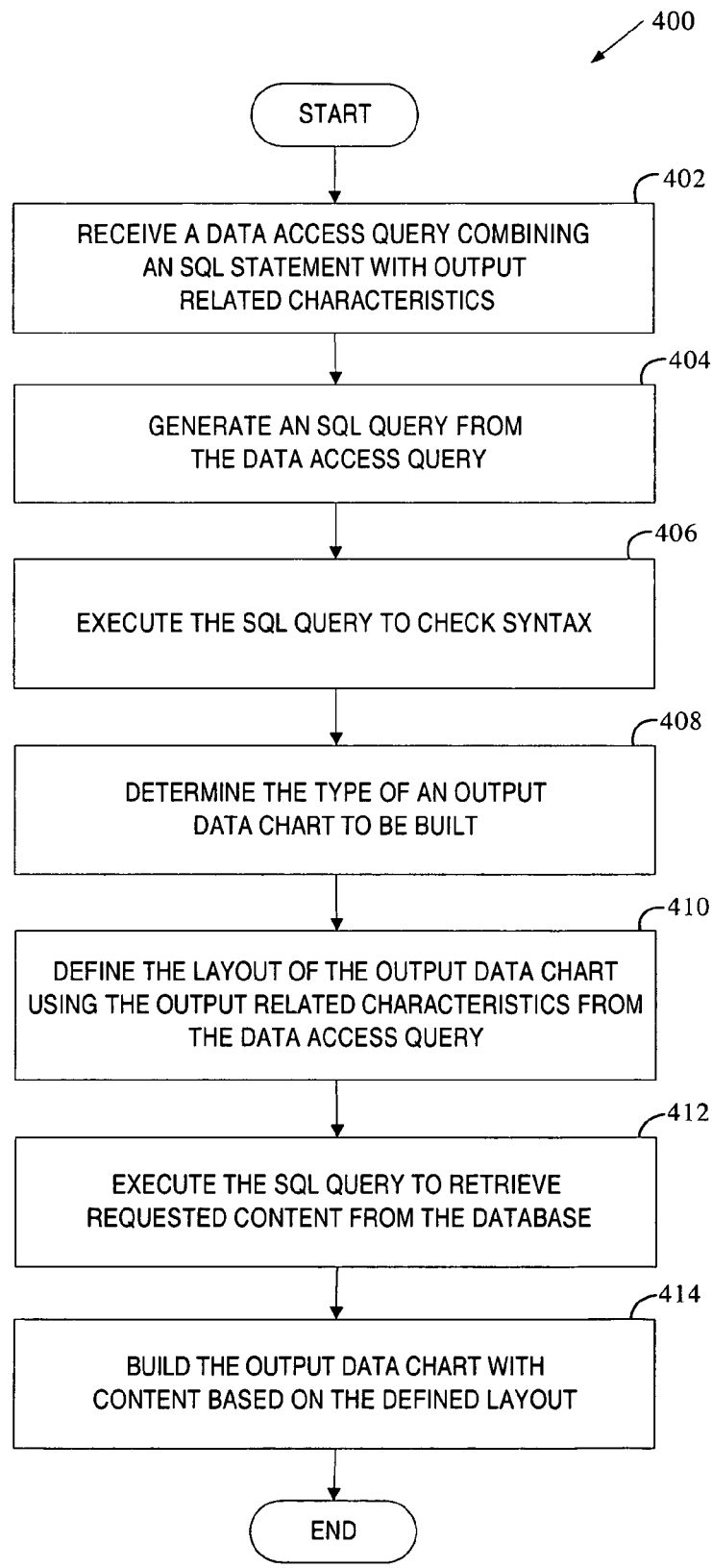
FIG. 4 is a flow diagram of one embodiment of a process for building an output data chart using an enhanced data access query.

FIG. 4 is a flow diagram of one embodiment of a process 400 for building an output data chart using an enhanced data access query. The process may be performed by processing logic that may comprise hardware (e.g., dedicated logic, programmable logic, microcode, etc.), software (such as run on a general purpose computer system or a dedicated machine), or a combination of both.

Referring to FIG. 4, process 400 begins with processing logic receiving an enhanced data access query that combines an SQL statement with output related characteristics of a data chart to be built (processing block 402). In one embodiment, the output related characteristics are associated with corresponding data elements in the SELECT clause. An output data chart may be a graph, a grid or any other form of a data chart that is capable of providing a graphical representation of the relationships between data elements of presented data. The output related characteristics may include, for example, dimensions of an output data chart, dimension properties (values that further describe a dimension), metrics (measured data elements such as, for example, allocated hours, booked hours, etc.), etc. The enhanced data access query may be defined by a query administrator.

Next, processing logic extracts an SQL statement from the enhanced data access query (also referred to herein as a data access query) (processing block 404) and executes the SQL statement to ensure that the syntax of the data access query is correct (processing block 406).

At processing block 408, processing logic determines the type of the output data chart to be built (e.g., whether the output data chart is a graph or grid). In one embodiment, the determination is made based on input provided by a data chart administrator. The data chart administrator may be a query administrator, an end user, or a third person participating in a data chart definition phase.

At processing block 410, processing logic defines the layout of the output data chart based on the output related characteristics contained in the data access query. In one embodiment, processing logic builds the output data chart without any additional user input (e.g., if the output data chart is a one-dimensional grid). In another embodiment, processing logic requests additional input from the user when building the output data chart (e.g., if the output data chart is a multi-dimensional graph, the data chart administrator may need to specify which dimension is to be a primary dimension for the main axis in the graph).

Subsequently, upon receiving a request to view a data chart from an end user, processing logic executes the SQL query to retrieve the requested content from the database (processing block 412) and uses the defined layout to build the output data chart with the requested content (processing block 414).

Figure 5:
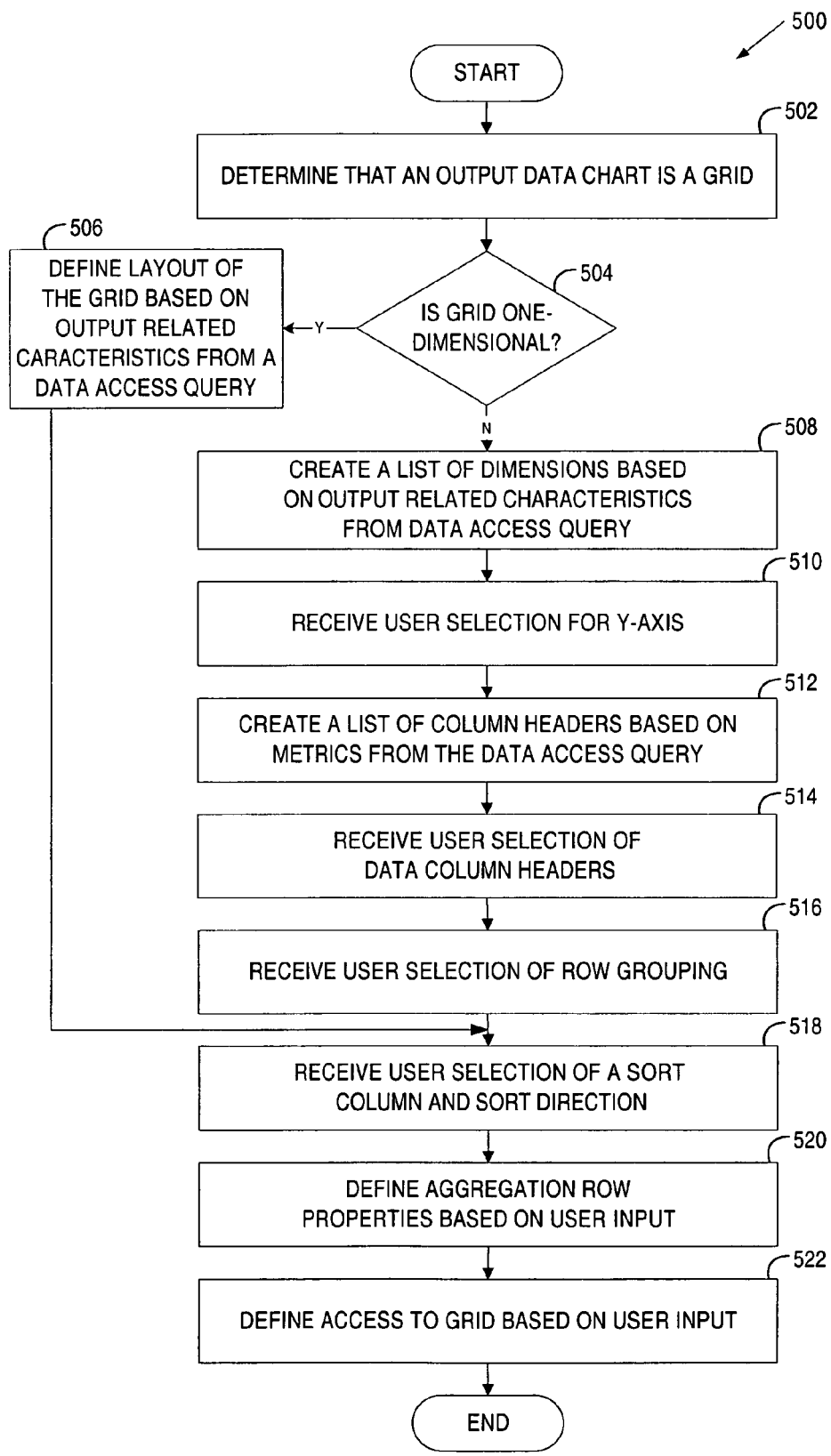
FIG. 5 is a flow diagram of one embodiment of a process for building a grid using an enhanced data access query.

FIG. 5 is a flow diagram of one embodiment of a process 500 for building a grid using an enhanced data access query. The process may be performed by processing logic that may comprise hardware (e.g., dedicated logic, programmable logic, microcode, etc.), software (such as run on a general purpose computer system or a dedicated machine), or a combination of both.

Referring to FIG. 5, process 500 begins with processing logic deciding that an output data chart is a grid (processing block 502) and then making a determination as to whether the grid is one-dimensional based on the number of dimensions identified in the enhanced data access query (processing block 504).

If the grid is one-dimensional, processing logic defines the layout of the grid based on the output related characteristics from the enhanced data access query (processing block 506). If the grid has multiple dimensions, processing logic creates a list of dimensions identified in the enhanced data access query (processing block 508), requests a data chart administrator to select a dimension for the Y axis (for the left most column in the grid), and receives data identifying the dimension that goes down the Y axis (processing block 510).

Next, processing logic creates a list of data column headers based on the metrics identified in the enhanced data access query (processing block 512), allows the data chart administrator to select the data column headers for the grid (processing block 514), and allows the data chart administrator to select how the column header rows are to be grouped in the grid (processing block 516).

Further, for any grid type, processing logic allows the data chart administrator to select how the columns in the grid are to be sorted and in which sort order (processing block 518) and defines aggregation row properties based on data provided by the data chart administrator (processing block 520).

Afterwards, processing logic defines access to the grid based on input provided by the data chart administrator (processing block 522). For example, specific resources, specific groups and specific business units may have grid view access, grid definition and view access, or grid definition and edit access.

Figure 6:
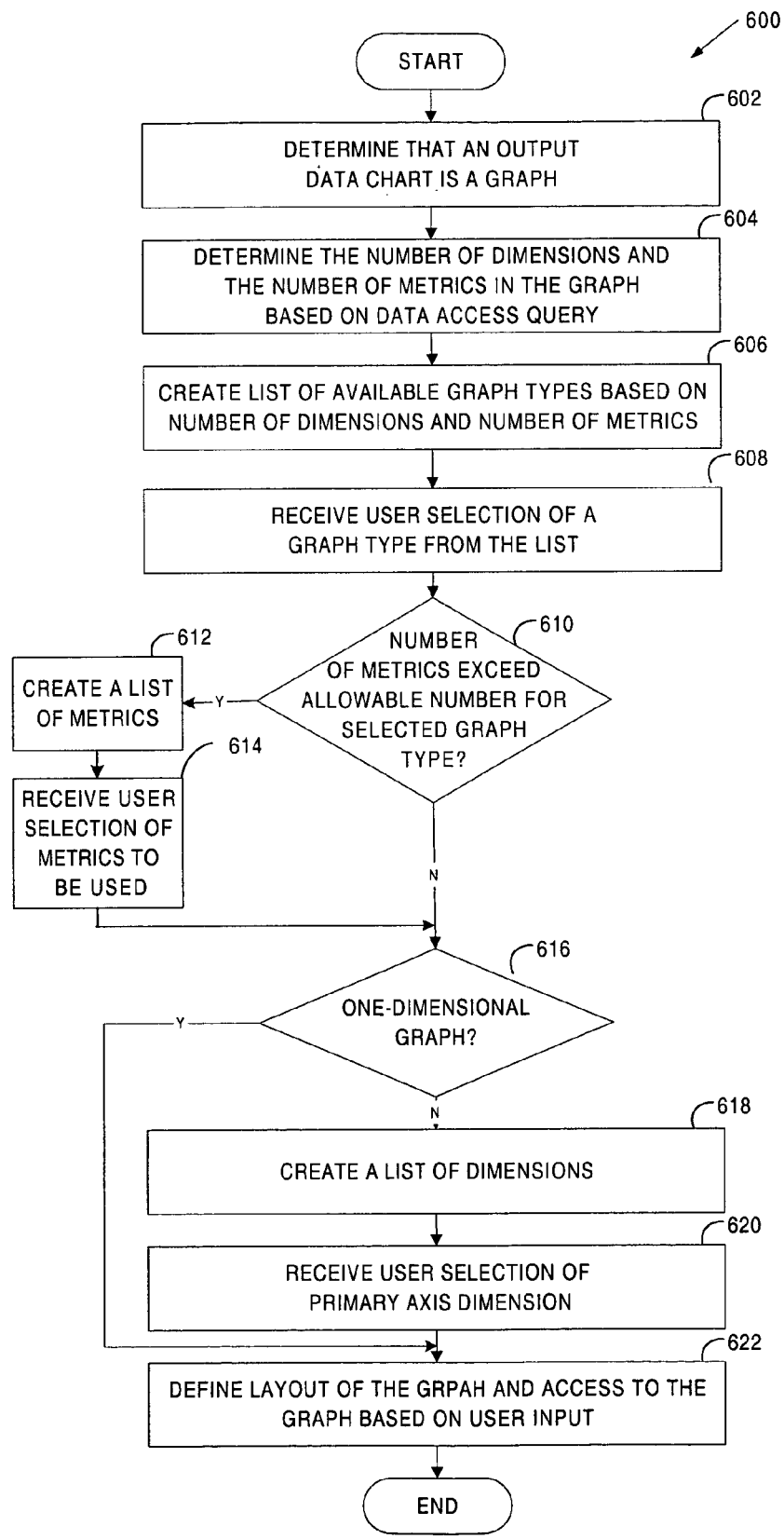
FIG. 6 is a flow diagram of one embodiment of a process for building a graph using an enhanced data access query.

FIG. 6 is a flow diagram of one embodiment of a process 600 for building a graph using an enhanced data access query. The process may be performed by processing logic that may comprise hardware (e.g., dedicated logic, programmable logic, microcode, etc.), software (such as run on a general purpose computer system or a dedicated machine), or a combination of both.

Referring to FIG. 6, process 600 begins with processing logic deciding that an output data chart is a graph (processing block 602) and then determining the number of dimensions and the number of metrics in the graph based on output-related characteristics in the enhanced data access query (processing block 604).

Next, processing logic creates a list of graph types (e.g., a bar graph, a column graph, a line graph, a funnel graph, a pie graph, a scatter plot, a bubble graph, etc.) that are available for the determined number of dimensions and metrics (processing block 606) and requests a data chart administrator to select a desired graph type from the created list (processing block 608).

Further, processing logic determines whether the number of metrics in the enhanced access query exceeds the number of metrics allowed for the selected graph type (processing block 610). If not, processing logic proceeds directly to processing block 616. If so, processing logic creates a list of metrics identified in the enhanced data access query (processing block 612), receives data identifying the selection of the metrics to be used in the graph by the data chart administrator (processing block 614), and then proceeds to processing block 616.

At processing block 616, processing logic determines whether the graph is one-dimensional. If so, processing logic proceeds directly to processing block 622. If not, i.e., the graph has multiple dimensions, processing logic creates a list of dimensions identified in the enhanced data access query (processing block 618), requests the data chart administrator to select a dimension for the primary axis (processing block 624), and then proceeds to processing block 622.

At processing block 622, processing logic creates the layout of the graph based on the output related characteristics from the enhanced data access query.

Afterwards, processing logic defines access to the graph based on input provided by the data chart administrator (processing block 624). For example, specific resources, specific groups and specific business units may have grid view access, grid definition and view access, or grid definition and edit access.

Building a Data Chart with Customized Filters

Figure 7:
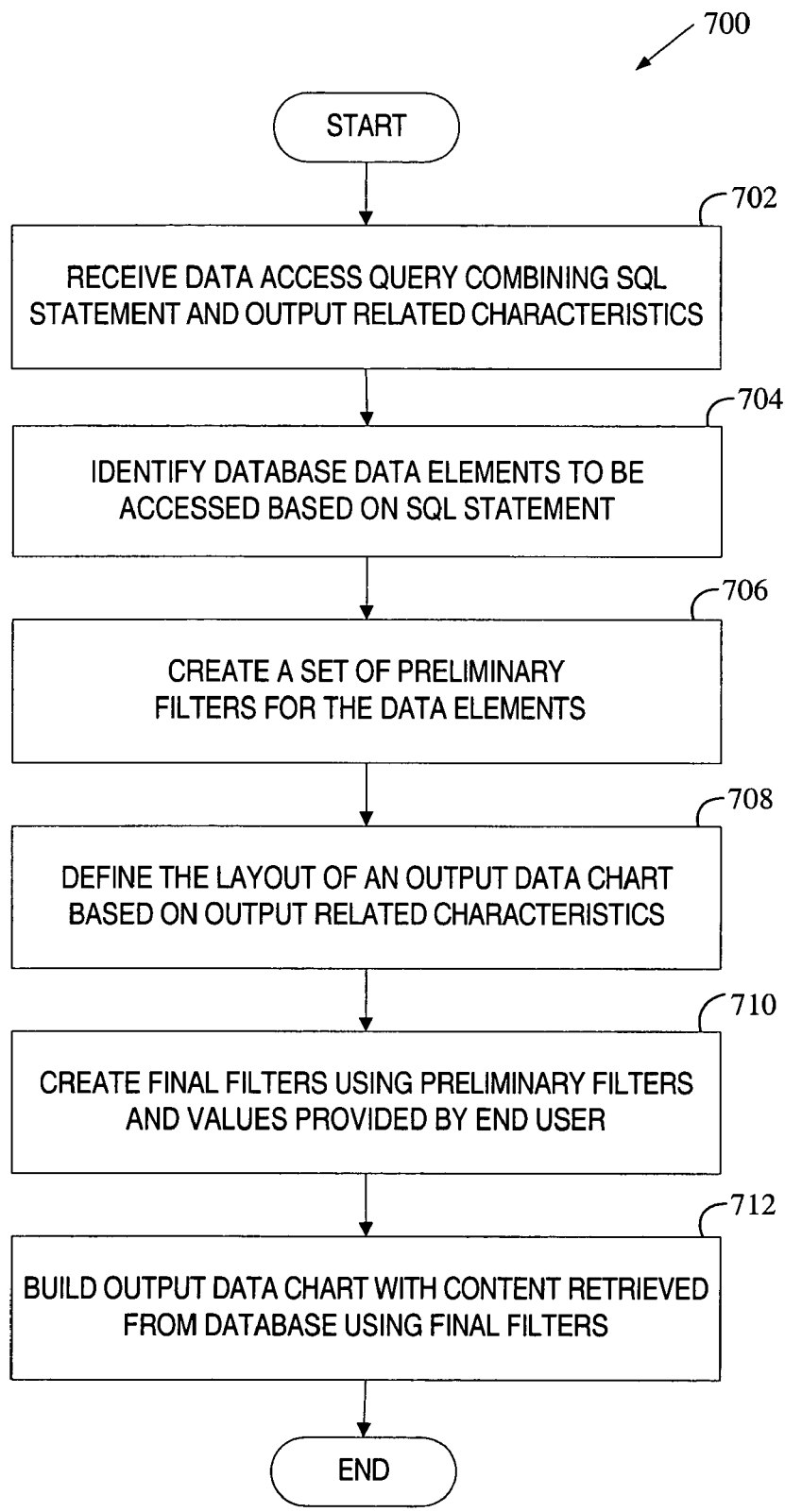
FIG. 7 is a flow diagram of one embodiment of a process for building an output data chart with customizable filters using an enhanced data access query.

FIG. 7 is a flow diagram of one embodiment of a process 700 for building an output data chart with customized filters using an enhanced data access query. The process may be performed by processing logic that may comprise hardware (e.g., dedicated logic, programmable logic, microcode, etc.), software (such as run on a general purpose computer system or a dedicated machine), or a combination of both.

Referring to FIG. 7, process 700 begins with processing logic receiving a data access query that combines an SQL statement with output related characteristics of a data chart to be built (processing block 702). In addition, the data access query is modifiable, i.e., it allows for subsequent addition of customized filters as discussed in more detail above. In one embodiment, the data access query contains information pertaining to filter properties. For example, the data access query may specify which of its data elements are user-defined, have database-defined data types, require a lookup list of values for selection by an end user, etc.

An exemplary data access query can be expressed as follows:

defined data type ("IMPLIED"), rather than a user-specified data type. The parameter is also user-defined but it requires a lookup list for an end user selection.

The SQL statement extracted from the above data access query can be presented as follows:

| SELECT | R.FULL_NAME RSRC, |
| | MR. FULL_NAME MANAGER, |
| | COUNT(*) PROJECT_COUNT |
| FROM | SRM PROJECTS P, |
| | SRM RESOURCES R, |
| | SRM RESOURCES MR, |
| | CMN_SEC_USERS U |
| WHERE | P.CREATED_BY = U.ID |
| AND | U.ID = R.USER_ID |
| AND | R.MANAGER_ID = MR.USER_ID |
| AND | (? IS NULL OR |
| | ? = R.PERSON_TYPE) |
| AND | 1=? |
| GROUP BY | R.FULL_NAME, |
| | MR. FULL_NAME |

Next, processing logic identifies data elements that are to be accessed according to the SQL statement (processing block 706) and creates a set of preliminary filters for these data elements (processing block 708) as discussed in more detail above.

At processing block 710, processing logic defines the layout of the output data chart to be built using output related characteristics contained in the data access query as discussed in greater detail above.

Further, processing logic creates final filters using the preliminary filters and filter values provided by an end user (processing block 710), uses the final filters to retrieve the requested content from the database, and builds the output data chart with the requested content based on the defined layout (processing block 712).

Figure 8:
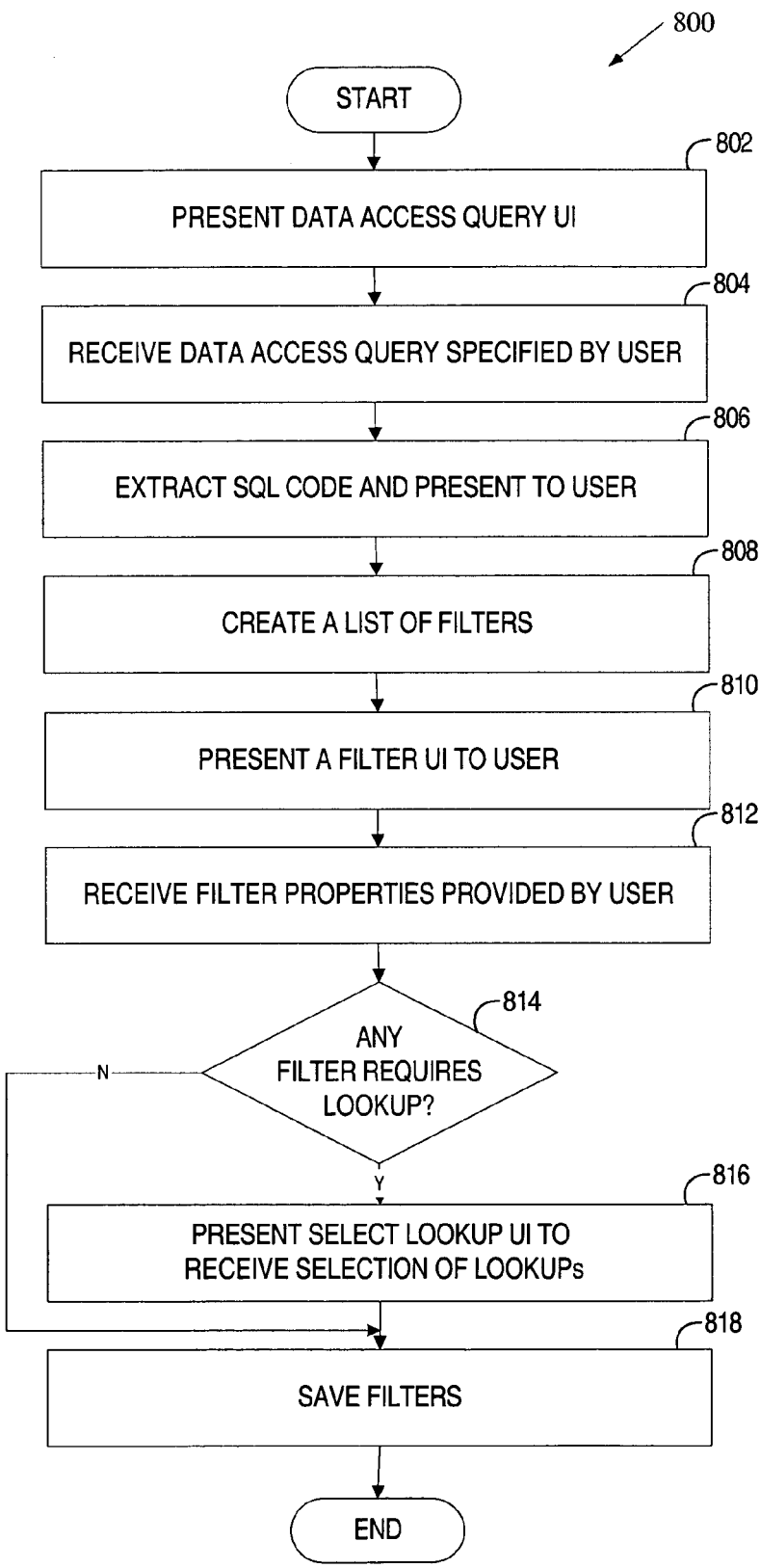
FIG. 8 is a flow diagram of one embodiment of a process for performing a query phase of data chart creation.

FIG. 8 is a flow diagram of one embodiment of a process 800 for performing a query phase of data chart creation. The process may be performed by processing logic that may comprise hardware (e.g., dedicated logic, programmable logic,

| SELECT | @SELECT:DIM:USER_DEF:IMPLIED:RESOURCE:R.FULL_NAME:RSRC@, |
| | @SELECT:DIM_PROP:USER_DEF:IMPLIED:RESOURCE:MR.FULL_NAME:MANAGER@, |
| | @SELECT:METRIC:USER_DEF:IMPLIED:COUNT (*) :PROJECT_COUNT:AGG@ |
| FROM | SRM_PROJECTS P, |
| | SRM_RESOURCES R, |
| | SRM_RESOURCES MR, |
| | CMN_SEC_USERS U |
| WHERE | P.CREATED BY = U.ID |
| AND | U.ID = R.USER_ID |
| AND | R.MANAGER_ID = MR.USER_ID |
| AND | (@WHERE:PARAM:USER_DEF:LOV:RESOURCE_TYPE@ IS NULL OR |
| | @WHERE:PARAM:USER_DEF:LOV:RESOURCE_TYPE@ = R.PERSON_TYPE) |
| AND | @FILTER@ |
| GROUP BY | R.FULL_NAME |
| | MR. FULL_NAME |
| HAVING | @HAVING_FILTER@ |

This data access query defines a data chart with one dimension (the resource), one dimension property (the name of this resource's manager), one metric (the number of projects the resource has created), and one parameter (a filter to select a subset of the resources in the system based on the type). Each dimension, dimension property, and metric is user-defined ("USER_DEF"), rather than built-in, and has a database-microcode, etc.), software (such as run on a general purpose computer system or a dedicated machine), or a combination of both.

Figure 10:
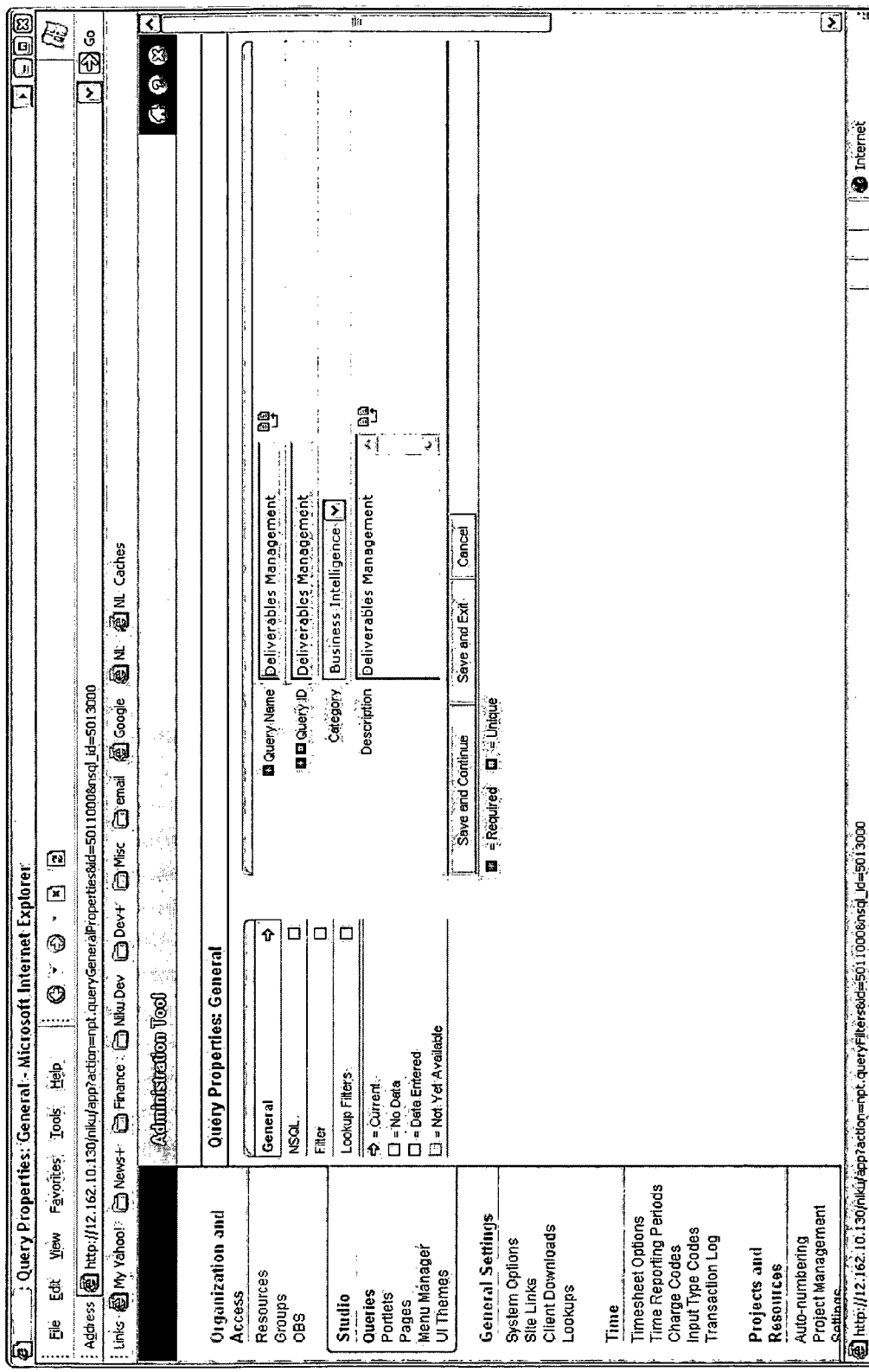
Figure 11:
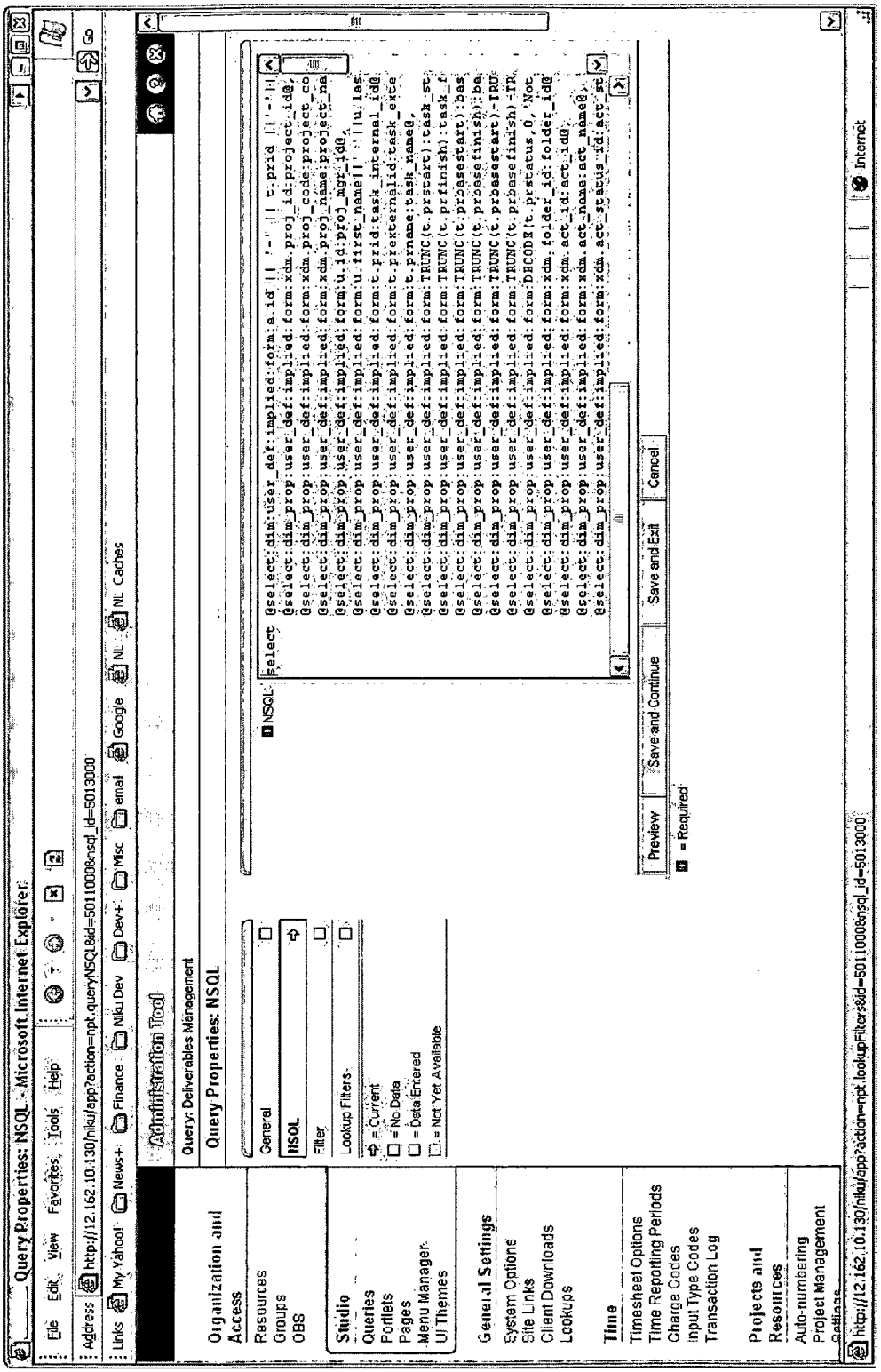

Referring to FIG. 8, process 800 begins with processing logic presenting a data access query UI to a query administrator (processing block 802). The data access query UI allows the query administrator to enter general information about the data access query such as the query name, ID, category and description, as illustrated in an exemplary UI of FIG. 10. In addition, the data access query UI allows the query administrator to enter an enhanced data access query that allows for customization of filters and identifies associated database data elements with output-related characteristics of a data chart to be built, as illustrated as NSQL in an exemplary UI of FIG. 11.

At processing block 806, processing logic extracts the SQL code from the enhanced data access query entered via the data access query UI, executes it to check for syntax and presents it to the query administrator for review.

Figure 12:
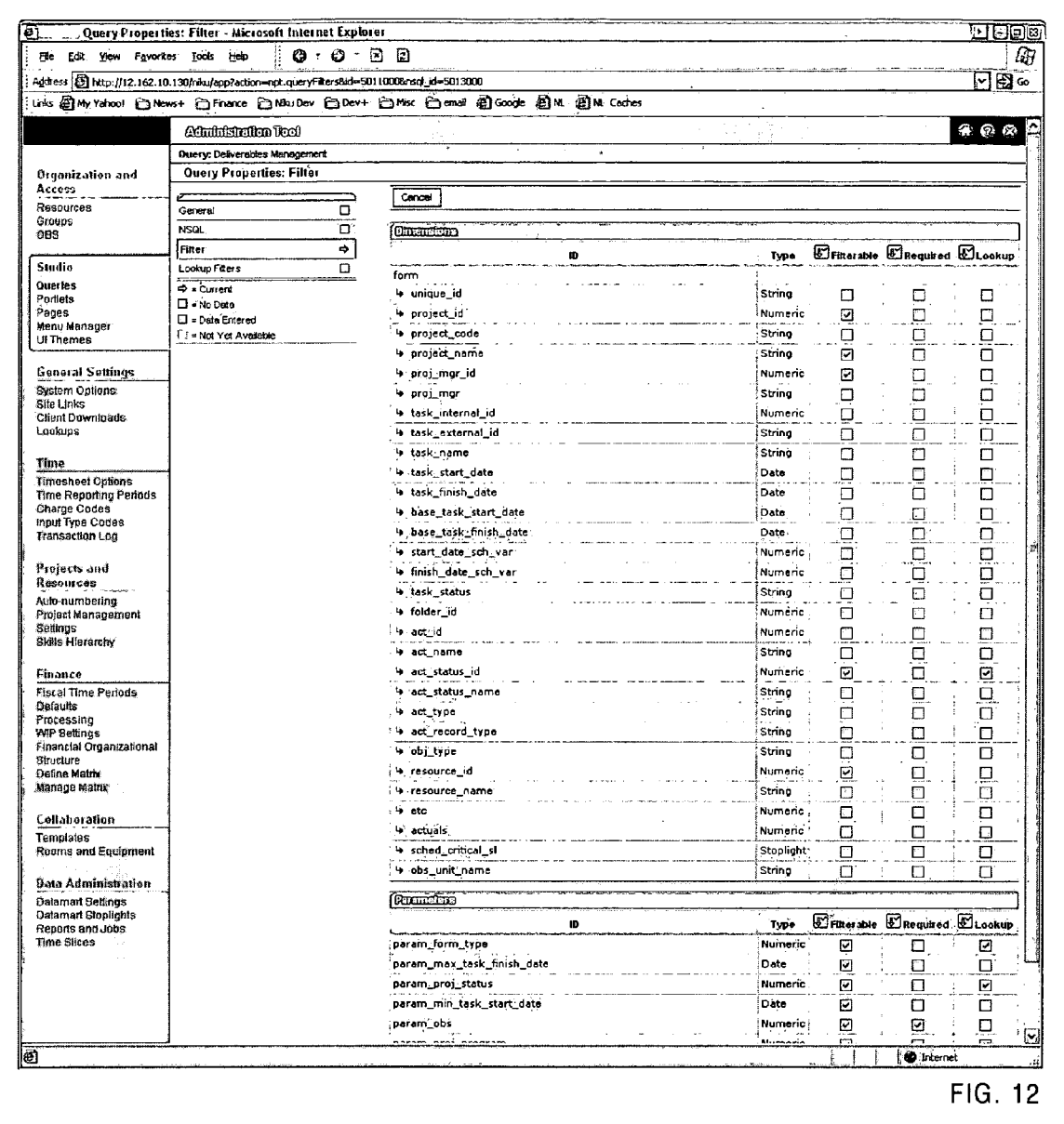

Next, processing logic creates a list of preliminary filters (processing block 808), determines properties of the preliminary filters (e.g., filter data type, filterable property, default required property and lookup required property) based on filter information provided in the enhanced data access query, and presents a filter UI with filter properties information to the query administrator. An exemplary filter UI is illustrated in FIG. 12, which includes a list of filters with their properties and shows that the query administrator may change some filter properties such as filterable property, default required property and lookup required property.

Figure 13:
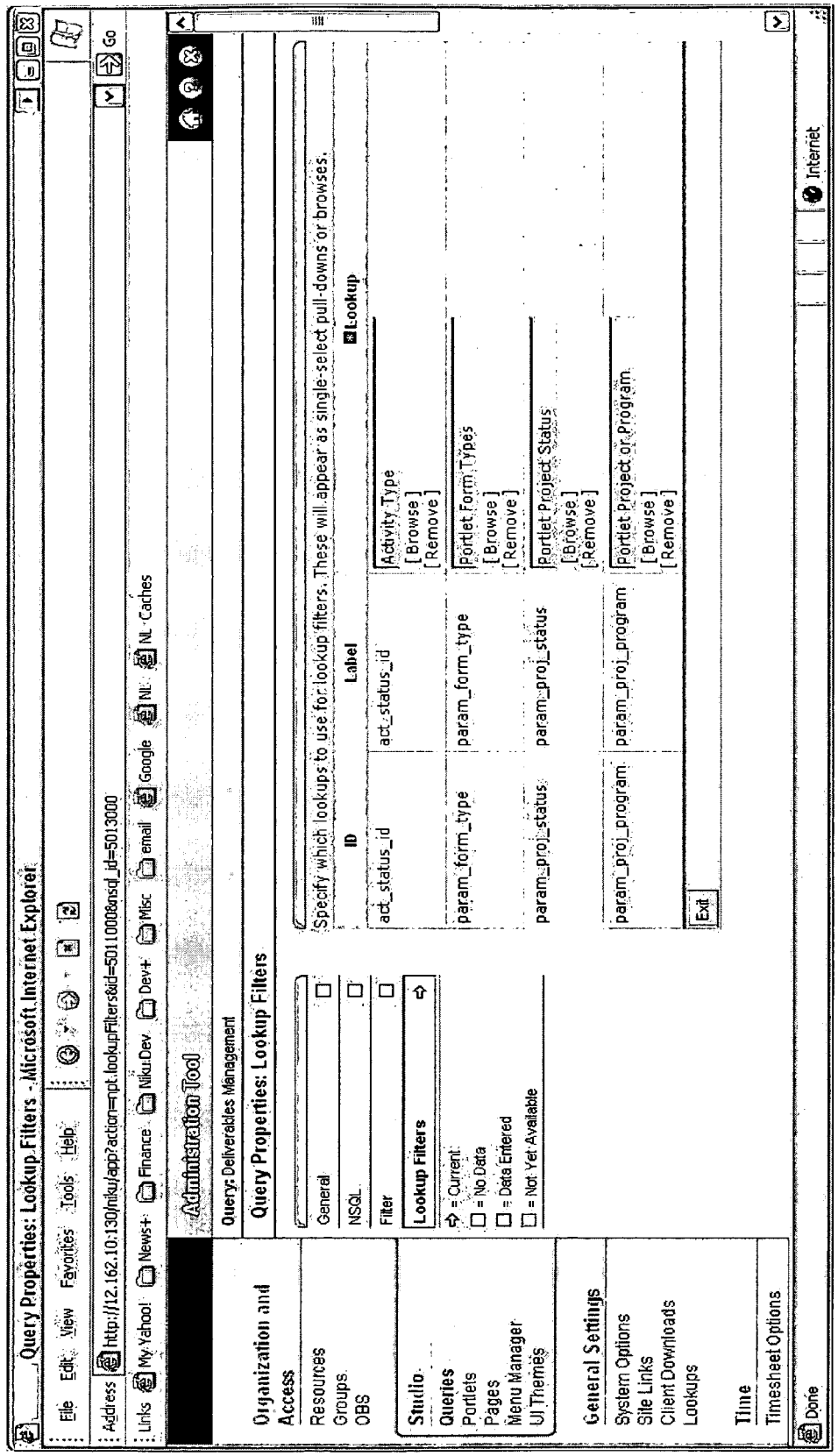

Once processing logic receives information on the filter properties (processing block 812), it determines whether any filter requires a lookup list to be provided for it (processing block 814). If not, processing logic directly proceeds to processing block 818. If so, processing logic presents a lookup filter UI allowing the query administrator to specify which lookup list of values is to be used for each lookup filter (processing block 816) and then proceeds to processing block 816. A lookup list of values may be presented to an end user as a pull-down menu or a browse link. An exemplary lookup filter UI is illustrated in FIG. 13.

At processing block 818, processing logic saves the filters and the output related characteristics from the enhanced data access query.

Figure 9:
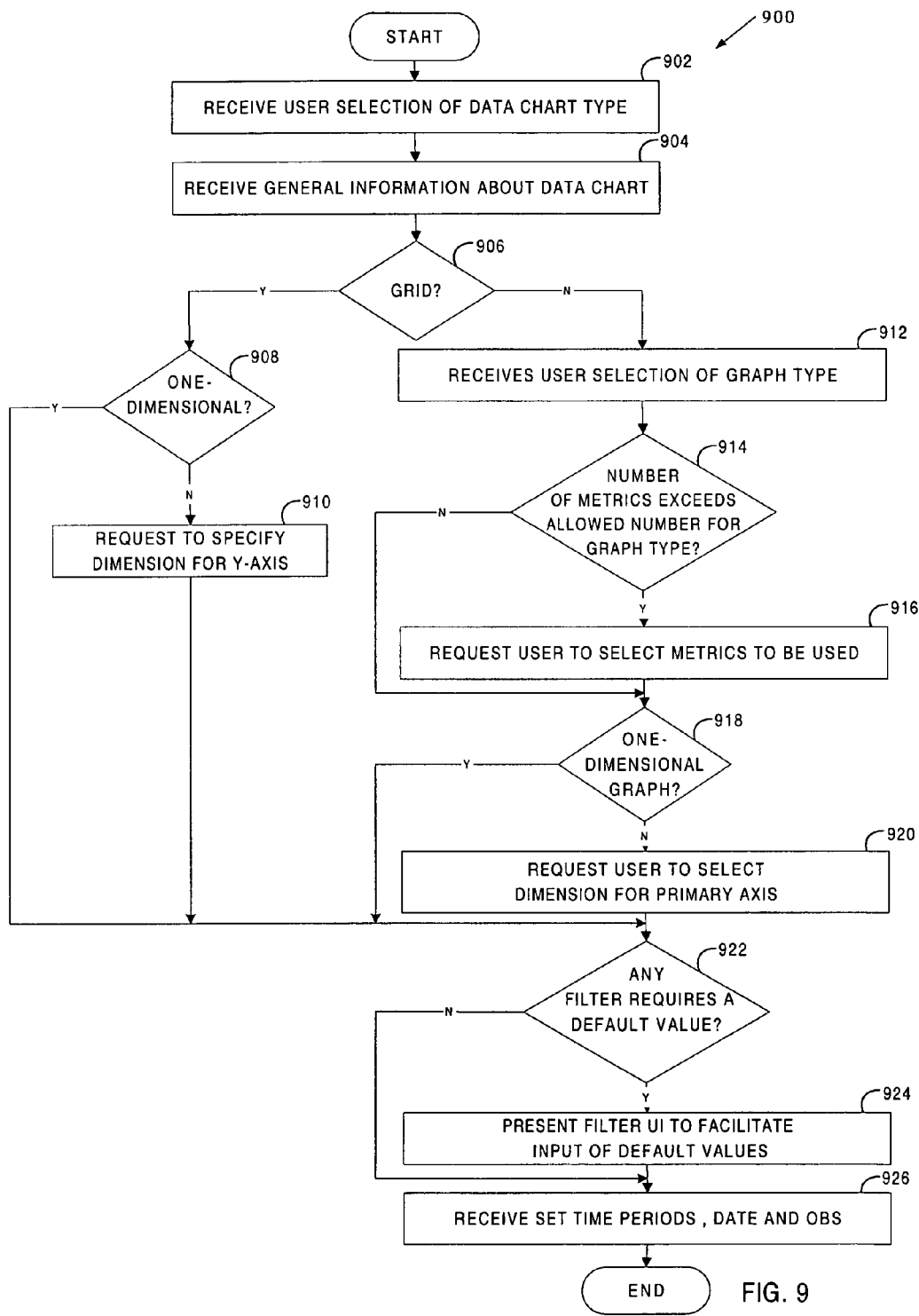
FIG. 9 is a flow diagram of one embodiment of a process for performing a data chart definition phase of data chart creation.

FIG. 9 is a flow diagram of one embodiment of a process 900 for performing a data chart definition phase of data chart creation. The process may be performed by processing logic that may comprise hardware (e.g., dedicated logic, programmable logic, microcode, etc.), software (such as run on a general purpose computer system or a dedicated machine), or a combination of both.

Referring to FIG. 9, process 900 begins with processing logic receiving data identifying the selection of the data chart type by a data chart administrator (processing block 902) and receiving general information about the data chart such as the chart name, category, description and size and the name of an associated data access query (processing block 904).

Next, processing logic determines whether the data chart is a grid (processing block 906). If so, and it is a one-dimensional grid (processing block 908), processing logic proceeds directly to processing block 922. If the grid has multiple dimensions, processing logic requests the data chart administrator to select a dimension for the Y axis (processing block 910) and then proceeds to processing block 922.

If the data chart is a graph, processing logic presents to the data chart administrator a list of graph types that are available for the number of dimensions and metrics specified in the enhanced data access query and requests the data chart administrator to select a desired graph type from the created list (processing block 912).

Further, processing logic determines whether the number of metrics in the enhanced access query exceeds the number of metrics allowed for the selected graph type (processing block 914). If not, processing logic proceeds directly to processing block 918. If so, processing logic creates a list of metrics identified in the enhanced data access query, requests the data chart administrator to select the metrics to be used in the graph (processing block 916), and then proceeds to processing block 918.

At processing block 918, processing logic determines whether the graph is one-dimensional. If so, processing logic proceeds directly to processing block 922. If not, i.e., the graph has multiple dimensions, processing logic creates a list of dimensions identified in the enhanced data access query, requests the data chart administrator to select a dimension for the primary axis (processing block 920), and then proceeds to processing block 922.

Figure 14:
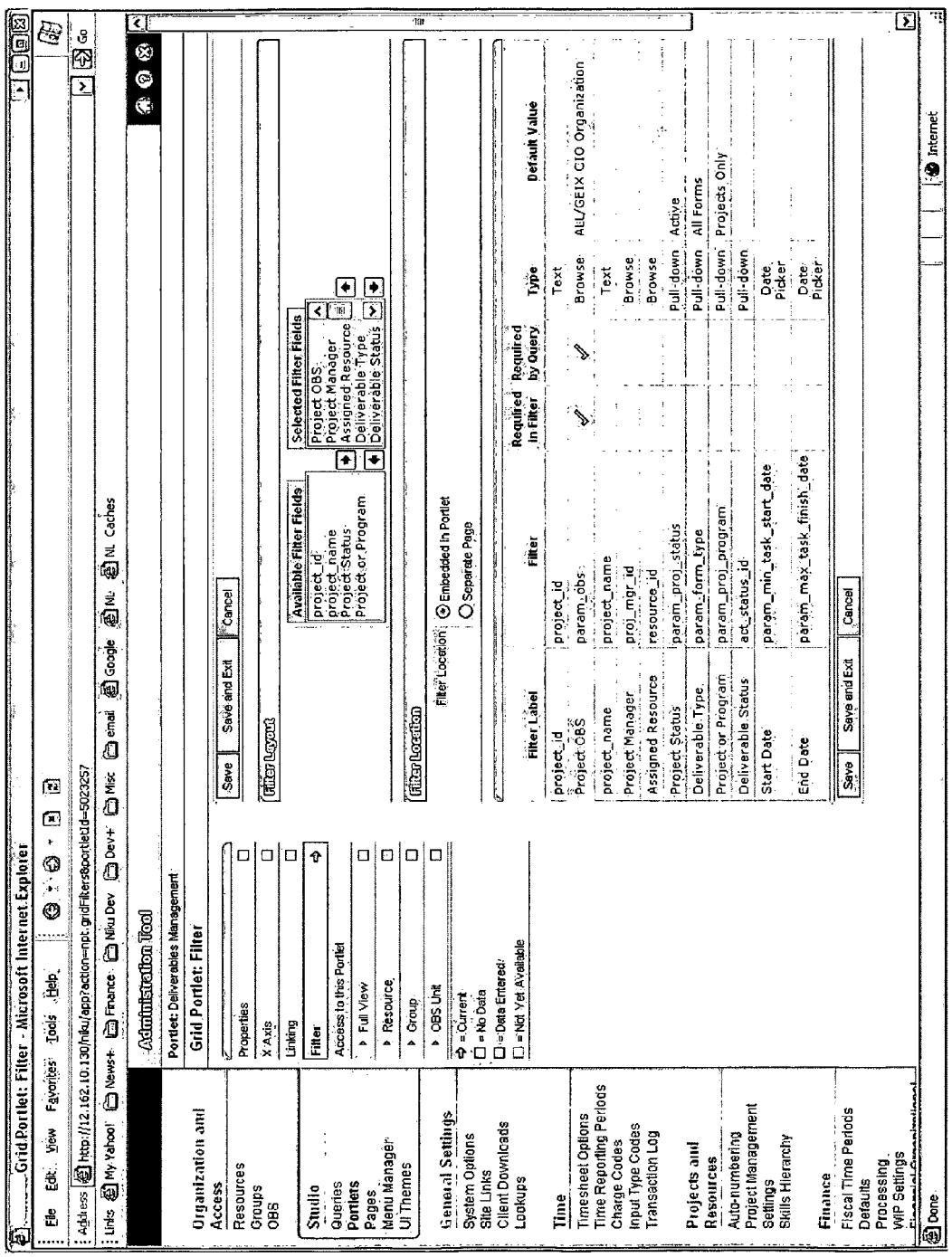

At processing block 922, processing logic determines whether any if the associated filters require a default value. If no, processing logic proceeds directly to processing block 926. If so, processing logic presents a filter user interface that allows the data chart administrator to provide default values and make changes to the list of filters to be presented to an end user. FIG. 14 illustrates an exemplary filter UI presented to a data chart administrator. A "required in filter" checkbox means that the data chart administrator needs to provide a default value for this filter but this default value may be later overwritten by a value specified by an end user. A "required by query" checkbox means that the data chart administrator needs to provide a default value for this filter and this default value will not be overwritten by a value specified by an end user.

Figure 15:
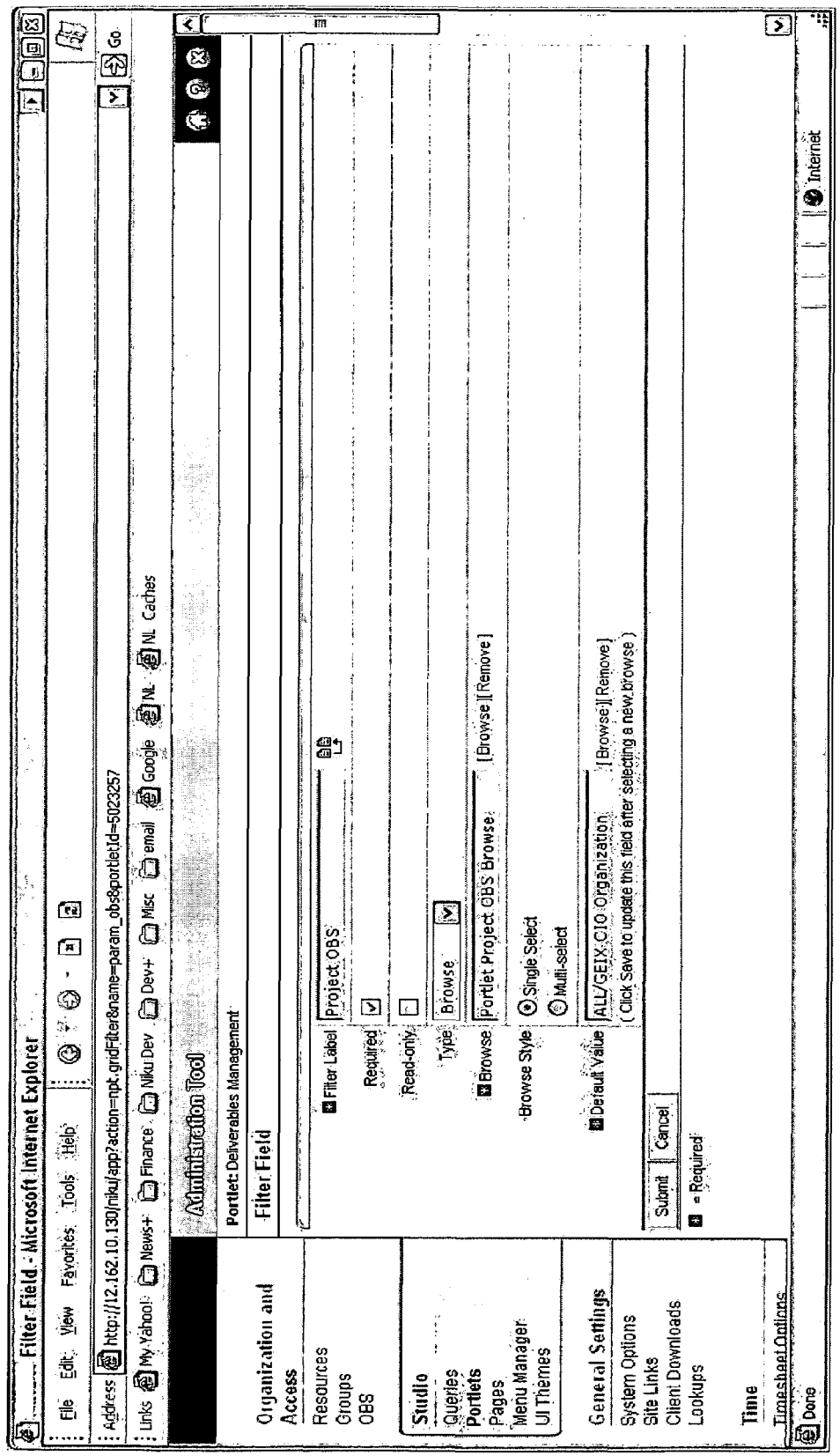

In one embodiment, if the data chart administrator decides to make a change to a filter displayed in the UI of FIG. 14, a filter field UI appears to facilitate input of desired changes. An exemplary filter field UI is illustrated in FIG. 15.

Returning to FIG. 9, at processing block 926, processing logic allows the data chart administrator to set the time dimension (default time periods) in the data chart if the time dimension is used in the query. Default time periods may be provided by the data administrator and then changed by an end user. Processing logic may also allow the data chart administrator to set specific dates (e.g., the project start date) that may be later changed by an end user. In addition, processing logic may allow the data chart administrator to set single or multiple organizational breakdown structure (OBS) units for parameter and property fields (e.g., to request projects that fall in this OBS) and for dimensions (e.g., to request cost and revenue for specific OBS units). An OBS unit may identify, for example, a specific geographic location or a specific department within an organization.

Figure 16:
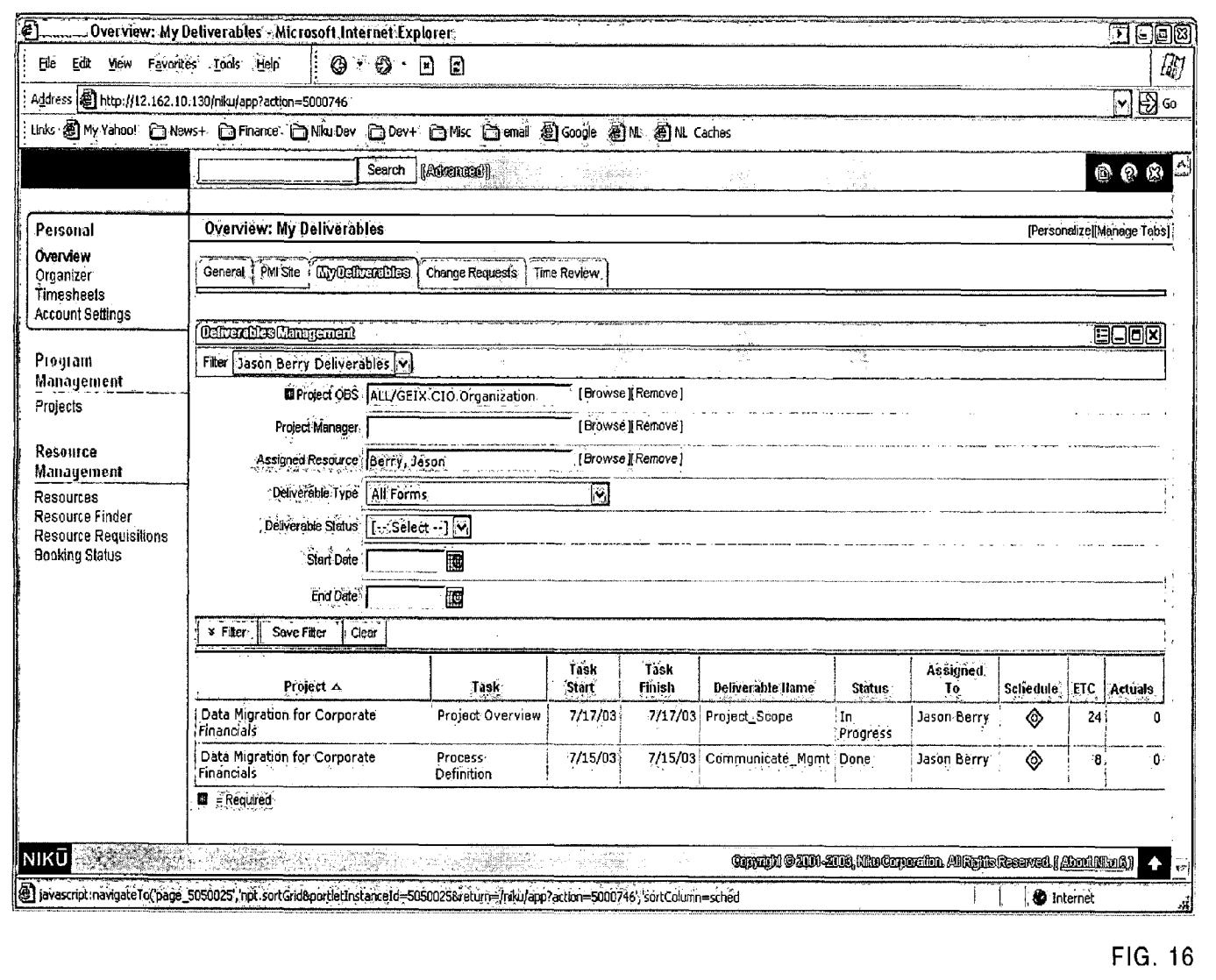

FIG. 16 illustrates an exemplary personal data chart UI presented to an end user. This personal data chart UI allows the end user to provide filter values and builds a grid with the content that is retrieved from a database using the filters specified by the end user.

An Exemplary Computer System

Figure 17:
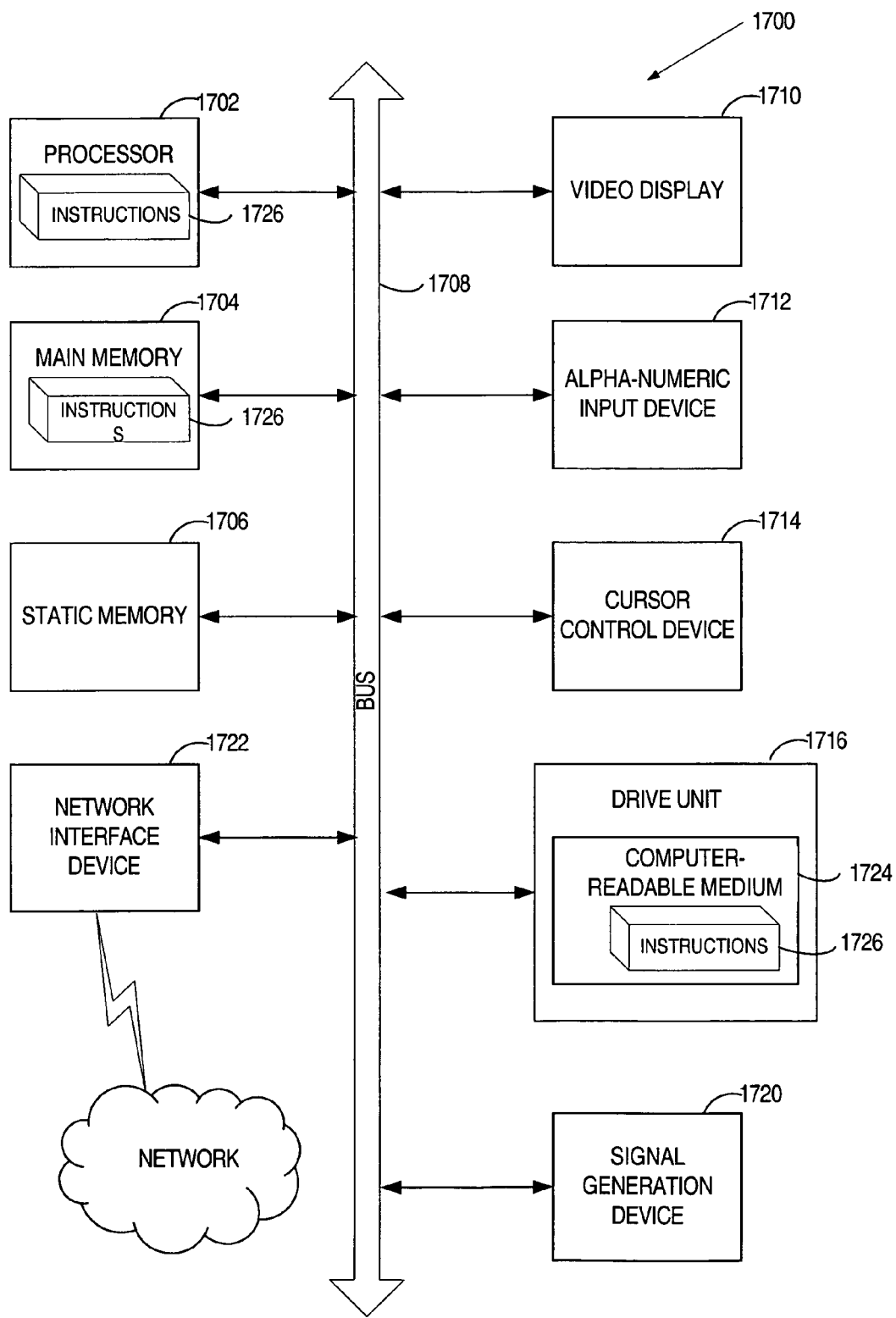
FIG. 17 is a block diagram of an exemplary computer system.

FIG. 17 is a block diagram of an exemplary computer system 1700 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1700 includes a processor 1702, a main memory 1704 and a static memory 1706, which communicate with each other via a bus 1708. The computer system 1700 may further include a video display unit 1710 (e.g., a liquid crystal display (LCD) or a cathode ray tube (CRT)).

The computer system 1700 also includes an alpha-numeric input device 1712 (e.g., a keyboard), a cursor control device 1714 (e.g., a mouse), a disk drive unit 1716, a signal generation device 1720 (e.g., a speaker) and a network interface device 1722.

The disk drive unit 1716 includes a computer-readable medium 1724 on which is stored a set of instructions (i.e., software) 1726 embodying any one, or all, of the methodologies described above. The software 1726 is also shown to reside, completely or at least partially, within the main memory 1704 and/or within the processor 1702. The software 1726 may further be transmitted or received via the network interface device 1722. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable storage medium" shall accordingly be taken to include, but not be limited to, solid-state memories, and optical and magnetic disks.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising
   receiving a data access query that combines a structured query language (SQL) clause with non-SQL data including output related characteristics of an output data chart, the data access query being noncompliant with an SQL standard and being provided by a first user, the output related characteristics including a definition of the output data chart to be built;
   extracting an SQL query compliant with the SQL standard from the data access query using the SQL clause;
   creating a layout of the output data chart using the output related characteristics included in the data access query; and
   upon receiving a request of a second user to view the output data chart, executing the SQL query to retrieve content from a database, and building the output data chart with the retrieved content for the second user using the created layout.

2. The method of claim 1 wherein the first user is familiar with a data model of a database being queried and the second user is not familiar with the data model of the database being queried.

3. The method of claim 1 wherein the output data chart is one selected from the group consisting of a graph and a grid.

4. The method of claim 1 wherein the definition of the output data chart includes characteristics selected from the group consisting of one or more dimension elements of the output data chart, one or more properties of each dimension element, and one or more metrics to be included in the output data chart.

5. The method of claim 1 wherein the data access query provides associations between database elements contained in the SQL clause with corresponding output related characteristics.

6. The method of claim 1 further comprising providing an access query user interface to assist the first user.

7. The method of claim 1 wherein building an output data chart further comprises:
   determining, based on user input, that the output data chart is a grid;
   determining whether the grid is one-dimensional or multi-dimensional based on the data access query, and
   if the grid is one-dimensional, identifying a structure of the grid based on the output related characteristics from the data access query.

8. The method of claim 7 further comprising:
   determining that the grid is multi-dimensional;
   creating a list of dimension elements of the grid using the output related characteristics from the data access query; and
   designating one dimension element from the list for a Y-axis of the grid based on user selection from the list of dimension elements.

9. The method of claim 1 wherein building an output data chart further comprises:
   determining, based on user input, that the output data chart is a graph;
   determining a number of dimensions and a number of metrics within the graph based on the output related characteristics from the data access query;
   identifying a list of available graph types based on the number of dimensions and the number of metrics; and
   determining a graph type to be used based on user selection from the list of available graph types.

10. The method of claim 9 further comprising:
    determining that the number of metrics exceeds an allowable number of metrics for the selected graph type;
    creating a list of metrics using the output related characteristics from the data access query, and
    identifying metrics to be used for the graph based on user selection from the list of metrics.

11. The method of claim 9 further comprising:
    if the graph has more than one dimension, creating a list of dimension elements for the graph using the data access query; and
    identifying a primary dimension for the graph based on user selection from the list of dimension elements.

12. The method of claim 1 further comprising making the output data chart available for integration into a personalized web page of the second user.

13. The method of claim 1 further comprising restricting access to the output data chart to employees of a certain business division.

14. The method of claim 1 further comprising:
    upon receiving the data access query, identifying a plurality of data elements in one or more database tables that are to be accessed according to the data access query; and
    creating a set of preliminary filters for the output data chart using the plurality of data elements in the one or more database tables.

15. The method of claim 14 further comprising:
    requesting the second user to specify parameters for one or more preliminary filters within the set of preliminary filters to define how content of the output data chart is to be restricted;
    creating final filters using the set of preliminary filters and specified parameters; and
    adding the final filters to a WHERE clause of an SQL statement extracted from the data access query.

16. A system comprising:
    a memory; and
    a processor, coupled to the memory, to receive a data access query that combines a structured query language (SQL) clause with non-SQL data including output related characteristics of an output data chart, the data access query being noncompliant with an SQL standard and being provided by a first user, the output related characteristics including a definition of the output data chart to be built, extract an SQL query compliant with the SOL standard from the data access query using the SQL clause, create a layout of the output data chart using the output related characteristics included in the data access query, and upon receiving a request of a second user to view the output data chart,
  cause content to be retrieved from a database through an execution of the SQL query, and build the output data chart with the retrieved content for the second user using the created layout.

17. The system of claim 16 wherein:
the first user is familiar with a data model of a database being queried and the second user is not familiar with the data model of the database being queried;
the output data chart is a graph or a grid; and
the data access query provides associations between database elements contained in the SQL clause with corresponding output related characteristics.

18. The system of claim 16 wherein the definition of the output data chart includes characteristics selected from the group consisting of one or more dimension elements of the output data chart, one or more properties of each dimension element, and one or more metrics to be included in the output data chart.

19. The system of claim 16 wherein the processor is further to build an output data chart by determining, based on user input, that the output data chart is a grid, determining whether the grid is one-dimensional or multi-dimensional based on the data access query, and identifying a structure of the grid based on the data access query if the grid is one-dimensional.

20. The system of claim 16 wherein the processor is further to build an output data chart by determining, based on user input, that the output data chart is a graph, determining a number of dimensions and a number of metrics within the graph based on the data access query, identifying a list of available graph types based on the number of dimensions and the number of metrics, and determining a graph type to be used based on user selection from the list of available graph types.

21. A computer readable storage medium comprising executable instructions which when executed on a processing system cause said processing system to perform a method comprising:

receiving a data access query that combines a structured query language (SQL) clause with non-SQL data including output related characteristics of an output data chart, the data access query being noncompliant with an SQL standard and being provided by a first user, the output related characteristics including a definition of the output data chart to be built;

extracting an SQL query compliant with the SQL standard from the data access query using the SQL clause, creating a layout of the output data chart using the output related characteristics included in the data access query; and upon receiving a request of a second user to view the output data chart, executing the SQL query to retrieve content from a database, and building the output data chart with the retrieved content for the second user using the created layout.

22. The computer readable medium of claim 21 wherein:
the first user is familiar with a data model of a database being queried and the second user is not familiar with the data model of the database being queried; and
the output data chart is a graph or a grid.

* * * * *